April 7, 1970     J. B. KENNEDY, JR     3,504,624
METHOD AND APPARATUS FOR ELECTROSTATIC PRINTING
Original Filed July 30, 1964
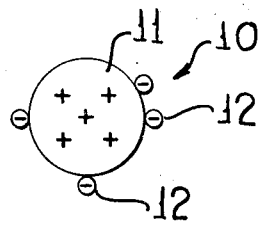
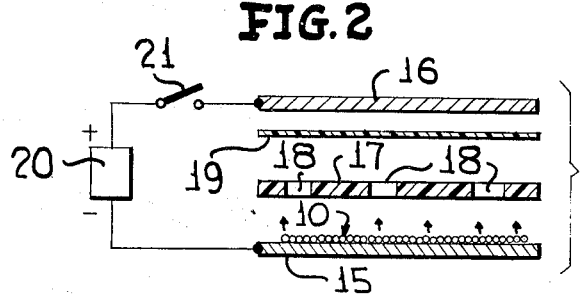
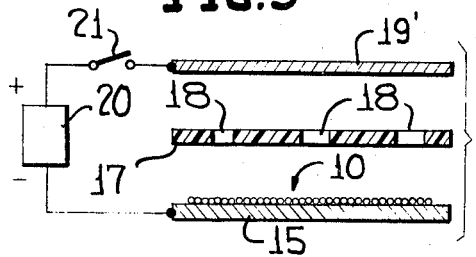
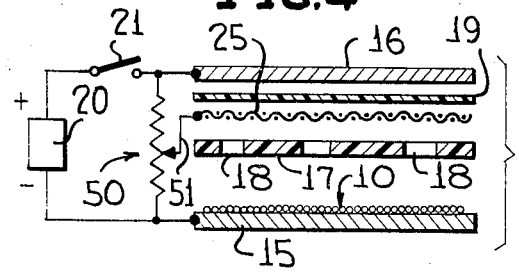
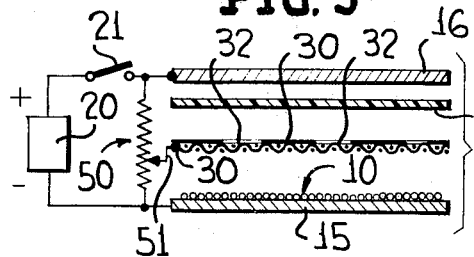
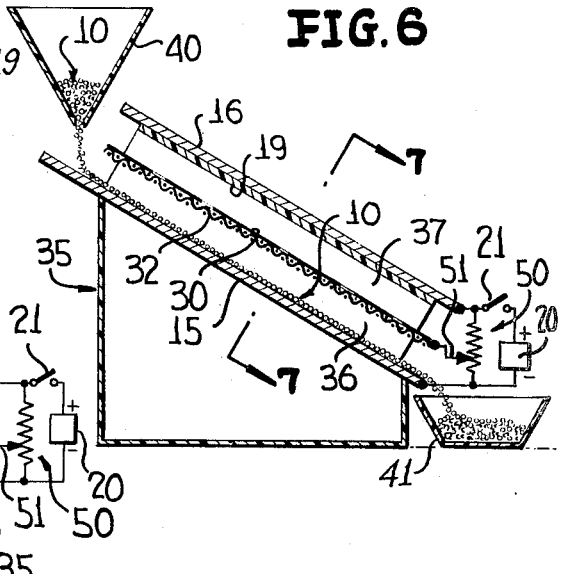
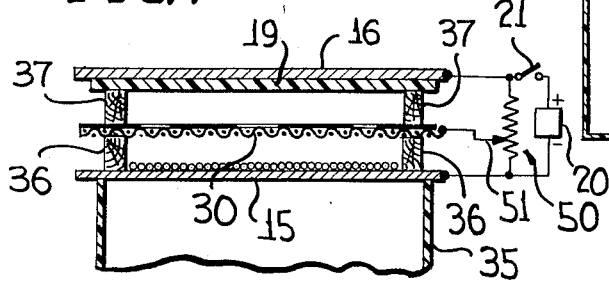
INVENTOR
JOHN B. KENNEDY, Jr.
BY
ATTORNEYS United States Patent Office 3,504,624
Patented Apr. 7, 1970

3,504,624
METHOD AND APPARATUS FOR ELECTROSTATIC PRINTING
John B. Kennedy, Jr., Chicago, Ill., assignor to Continental Can Company, Inc., N.Y., a corporation of New York
Continuation of application Ser. No. 386,182, July 30, 1964. This application Oct. 31, 1968, Ser. No. 772,438
Int. Cl. B41f 15/14
U.S. Cl. 101—114        24 Claims

ABSTRACT OF THE DISCLOSURE

An electrostatic coating process and apparatus wherein conductive carrier particles and/or non-conductive toner particles are carried by an electrostatic field, or electrostatic fields, from a base electrode toward, or to, a substrate for applying a selective coating thereto. A stencil screen is interposed between the base electrode and the substrate such that the substrate is coated with toner particles in a pattern defined by apertures in the stencil.

---

This application is a continuation of Ser. No. 386,182, filed July 30, 1964, now abandoned.

This invention relates to electrostatic printing, in which electrically charged particles are (1) accelerated by an electrostatic field, (2) caused to move through a pattern stencil, and (3) brought to deposition upon a substrate to be printed.

It is known to employ an electrostatic field to effect movement of particles for deposit in a pattern upon a substrate, with the pattern determined by previously providing the particles in the pattern upon a surface and then moving the same therefrom to the substrate; to employ a selectively charged substrate so that some parts thereof attract and hold particles and others do not; and to bring the particles to a charged pattern screen of conductive material whereby the particles are charged and then are attracted toward a substrate which, if of conductive material, is polarized oppositely to the charged particles and, if of non-conductive material, is displayed in front of a backing electrode charged oppositely to the particles.

According to the instant invention, a mixture of coarse conductive carrier particles and fine non-conductive toner particles is prepared, wherein one or more toner particles adhere to each carrier particle to form a developer mixture, the adhesion occurring by triboelectric effects when the particles are mixed. A base electrode is electrically charged, so that such developer mixture in contact therewith has the conductive carrier particles charged therefrom, so that a repulsion effect is established to cause the developer mixture to be repelled from the base electrode. A pattern stencil is presented in the path of the developer mixture, and a screen in such path serves mechanically to prevent the passage of the coarse carrier particles therebeyond while allowing the fine toner particles to continue onward to form a deposit upon the substrate. When the substrate. When the substrate is of conductive material, it is charged oppositely to the carrier particles for controlling the paths thereof from the base electrode to the screen; when the substrate is of non-conductive material, a backing electrode so charged is placed at the rear thereof.

The words "toner particles" are employed herein to designate particles smaller than the mesh of the screen, capable of adhesion to the carrier particles by a force less than that developed upon impact of the carrier particles against the screen, and capable of forming a pattern effect upon the substrate. In usual practice, the toner particles are of a different color than the substrate surface which is being printed.

There are distinct advantages arising from the use of conductive carriers and non-conductive toners. Non-conductive toners can be made from material of low melting temperature. Thus, the materials can generally be fused to printed objects more readily than available conductive toners. In addition, the toner particles may acquire considerably greater velocities by this method than they would is used alone. The large conductive carrier provides conductive charging because of contact with the base electrode, and can attain relatively large terminal velocities. The small toner particle passes through apertures in a stencil, or other type screen, with this high terminal velocity, so that the toner particle can travel a greater distance to an object to be printed than otherwise. Also, the time to travel a given distance can be substantially reduced and results in faster printing. Further, unlike conductive toner particles, a non-conductive toner is useful for printing on conductive surfaces. A conductive particle would surrender its charge and be easily displaced from such a surface.

Accelerating the toner particles prior to introduction through the stencil, or other type screen, also insures that the velocity vector associated with the toner particles is properly oriented, i.e., perpendicular to the screen stencil at time of passage through the stencil. This insures that minimal dispersion of the pattern will occur during transport. These two characteristics—high magnitude and proper orientation of the velocity vector at the time of introduction through the screen—are unique with methods and apparatus exemplified by the present invention.

An object of the present invention is to provide an electrostatic process for applying a selective coating to a substrate comprising the steps of mixing conductive carrier particles with toner particles so that the toner particles triboelectrically adhere to the carrier particles, depositing the carrier particles and the toner particles on a base electrode in spaced relation to the substrate, and establishing an electric field in the space between the substrate and, the base electrode for moving the carrier particles and toner particles to the substrate.

Another object of the present invention is to provide new and novel apparatus for coating a substrate with a selective coating of toner particles, the apparatus comprising a pair of spaced electrodes and a power source, one of the pair of electrodes being connected to the positive side of the power source and the other of the pair of electrodes being connected to the negative side of the power source, a developer mixture of carrier and toner particles carried by one of the pair of electrodes, and a screen interposed between the developer mixture and the other of the pair of electrodes.

A further object of the present invention is to provide apparatus, of the type heretofore described, wherein the screen is comprised of a sheet of material having a plurality of openings therein arranged to define a preselected pattern.

Another object of this invention is to provide a developer mixture of carrier particles and toner particles, for use with the previously referred-to apparatus, wherein the carrier particles are larger than openings in the screen and the toner particles are smaller than the openings.

With the above and other objects in view that will hereinafter appear, the nature of the invention will be more clearly understood by reference to the following detailed description, the appended claimed subject matter and the several views illustrated in the accompanying drawing.

In the drawing:

FIGURE 1 is a diagrammatical view illustrating a single developer particle which is comprised of a large carrier particle and a plurality of small toner particles.

FIGURE 2 is a diagrammatical apparatus assembly for a first form of practice according to the invention, wherein the substrate to be printed on is formed of non-conductive material.

FIGURE 3 is a diagrammatical showing of apparatus wherein the substrate to be printed on is comprised of conductive material, and the substrate is utilized as one of a pair of electrodes.

FIGURE 4 is a diagrammatical view of apparatus, similar to the view of FIGURE 2, and illustrates another form of practice wherein a separate small-mesh screen is interposed between the stencil screen and the substrate.

FIGURE 5 is another diagrammatical view of an apparatus assembly, similar to the views in FIGURES 2 and 4, and illustrating an embodiment of the invention wherein a conductive metal screen stencil embodies the pattern to be printed.

FIGURE 6 is a diagrammatic side elevational view of another form of apparatus for performing the present invention.

FIGURE 7 is a sectional view taken on line 7—7 of FIGURE 4.

An essential element of the present invention is a developer mixture, one particle of the developer mixture being generally indicated by the numeral 10, and being comprised of a large carrier particle 11 having a plurality of small toner particles 12 adhered thereto. The carrier particles 11 are formed of a conductive material such as charcoal, metal shot made of various materials, such as steel, aluminum, copper, or, preferably, small granular iron fillings of a range from around 25 to 1,000 microns. It will be apparent from the following description that the lower limit of particle size is determined by apertures in screens utilized in the present invention.

The toner particles 12 are preferably of non-conductive material and are commercially available types manufactured by the Xerox Corporation. These non-conductive toner particles 12 consist essentially of pigmented or dyed particles of a mixture of n-butyl methacrylate (41%) and polystyrene (59%), with an average particle size of about 17 microns. It is apparent that the carrier particles 11 are much larger than the toner particles 12 and, as is illustrated in FIGURE 1, a number of toner particles 12 can adhere to a single carrier particle 11 because of triboelectric forces.

In the practice according to FIGURE 2, a base electrode 15 and a backing electrode 16 are spaced parallel plates of electrically conductive material. A pattern stencil screen 17 is formed of non-conductive material, such as a sheet of methylmethacrylate polymer about one-quarter inch thick for stiffness. The stencil screen 17 is positioned between and spaced from the base electrode 15 and backing electrode 16, and has openings 18 therethrough for establishing the pattern to be printed. A substrate 19 to be printed is illustratively a sheet of paper and is positioned parallel to the electrodes and stencil, and spaced, e.g., one-quarter inch, from the stencil screen 17. While the substrate 19 is shown as being spaced from the backing electrode 16, it is to be understood that the substrate 19 can be in contact with the backing electrode 16.

A layer of developer mixture 10 is carried on the base electrode 15 and consists of a plurality of carrier particles 11 and toner particles 12. As previously pointed out, the toner particles 12 adhere to the conductive carrier particles 11 by triboelectric forces.

The base electrode 15 is preferably connected to the negative side of a high voltage source 20, and the backing electrode 16 is connected to the positive side of the high voltage source 20 by a suitable switch 21. The potential drop between the base electrode 15 and the backing electrode 16 may be 2,000 volts but is preferably much larger. Various factors must be considered in determining the preferred potential drop, such as the size and mass of the carrier particles 11 and toner particles 12, the distance between the base electrode 15 and the backing electrode 16, and the distance between the base electrode 15 and the substrate 19.

The conductive carrier particles 11 in contact with the base electrode 15 are charged by conduction therefrom so that the developer mixture 10 is repelled by the base electrode 15 and attracted by the oppositely charged backing electrode 16. The charged particles move and are accelerated upwardly as is indicated by the arrows shown in FIGURE 2. The particles which come to the openings 18 are passed therethrough and come into contact with the substrate 19 such that toner particles 12 are deposited thereon in a pattern determined by the openings 18. The particles which encounter the body of the stencil screen 17 are stopped, and prevented from reaching the substrate 19.

In practicing the invention according to the embodiment which is illustrated in FIGURE 3, a substrate 19' can be made of conductive material, e.g., a sheet of metal, and electrically connected to the high voltage source 20. In this embodiment, the backing electrode 16 can be dispensed with because the substrate 19' performs the function of the backing electrode.

In the practice according to FIGURE 4, a conductive metal screen electrode 25 is provided between the base electrode 15 and the substrate 19, either above the stencil screen 17, as illustrated, or if desired, may be positioned below the stencil screen 17. Apertures or openings in the conductive metal screen 25 are of smaller size than the coarse carrier particles 11 and are of larger size than the toner particles 12. Thus, the metal screen 25 will mechanically stop the carrier particles 11 while the momentum of the toner particles 12 causes the toner particles to detach from the carrier particles 11 and pass through the metal screen 25 and be deposited upon the substrate 19.

In the practice according to FIGURE 5, the functions of the pattern stencil screen 17 and conductive metal screen 25, of FIGURE 4, are combined by employing a conductive screen 30 with parts of its surface covered by a pattern coating 31 with openings 32 therethrough.

A preferred embodiment of the invention is shown in FIGURES 6 and 7, in which an insulating support 35 has the base electrode 15 secured thereto so its plane is inclined to the horizontal, e.g., at 30 degrees. Insulating spacer members 36 support the patterned conductive screen electrode 30 parallel to and spaced from the base electrode 15. Similar insulating spacer members 37 serve to hold the substrate 19 and the backing electrode 16 (here shown in contact with the substrate 19) in parallel and spaced relation relative to the base electrode 15 and pattern screen 30. The spacer members 36 are shown as being open at the upper and lower ends of the space between the base electrode 15 and the patterned screen 30 so that the developer mixture 10 can be introduced to such space from a hopper 40 for cascading downwardly over the upper surface of the base electrode 15, and the used developer mixture can be removed at the lower end of the base electrode 15 and collected in a basin 41 for mixture with additional toner particles prior to re-use.

In the various embodiments, the base electrode 15 and backing electrode 16 are preferably larger than the area occupied by the openings in the stencil screen 17 or patterned conductive screen 30. This difference in area produces a guard ring effect, so that the hypothetical lines of force extend in straight lines from one electrode to the other, in directions normal thereto. The electrostatic field which is produced between the spaced electrodes causes the charged carrier part icles and toner particles to move, in FIGURES 2–5, from the base electrode 15 at rgiht angles thereto, and the toner particles 12 are delivered to the substrate 19 and 19' by approaching the same at right angles to the lower surface of the backing electrode.

In FIGURES 2–5, with the electrodes in horizontl position, the upward flight of the carrier particles 11 and toner particles 12 is against gravity and in the opposite direction to the vector lines representing the force of gravity on the respective particles.

In the embodiment illustrated in FIGURES 6 and 7, the flight of the carrier particles 11 toner particles 12 is initially at right angles to the base electrode 15 but, because of the inclined position of the electrodes, the particles travel in a path which is the resultant of the electrostatic acceleration vector and the gravitation vector. When a charged carrier particle encounters and is stopped by the screen 30, it will thereafter fall downward toward the base electrode 15 and encounter the same at a point relatively downhill from its point of departure.

The practice of the present invention compares favorably with previous methods of electrostatic printing. The presently disclosed methods offer advantages over conventional printing, namely, the surface to be printed need not be subjected to pressure and need not be physically contacted. The proposed new methods are also unique in their ability to transfer toner paritcles over greater distances than preivous methods without loss in resolution. Distances between the stencil screen and substrate to be printed have been increased to one-quarter inch. Toner particles have also been transferred at one-half inch with but slight loss in resolution. While the substrate has been exemplified as a sheet of paper, the invention is not limited thereto and the increased ability to transfer toner particles over longer distances is of particular interest for printing on substrates of irregular contour.

One of the greatest advantages of the disclosed invention is the ability to accomplish electrostatic printing through stencil screens with non-conductive toner particles. The use of non-conductive toner particles is of particular merit because such toner particles contain materials with low melting points and, hence, may be readily fixed by heat or suitable solvents, to the materials or substrate to be printed.

It is apparent from the foregoing that there has been disclosed various unique and novel methods and apparatus for electrostatic printing. Each disclosed embodiment is capable of producing a satisfactory print upon a substrate; however, when a multiple number of prints are being produced, there is a tendency for some of the charged carrier particles and toner particles to adhere to the various screens 17, 25 or 30 such that a charge is built up which exerts a repulsive force against an approaching carrier particle, to slow it down or deflect it. Such an effect is limited by the fact that the various screens, while floating electrically, are held in place by electrical insulators and thus can dissipate, at a limited rate, the buildup of a charge on the various screens. It is also possible that corona discharges may take place at local areas of the screens. Thus, two mechanisms may exist for limiting the buildup on the screens.

A more expeditious manner of dissipating this undesirable buildup of charge will be apparent from a further considerable of FIGURES 4–7. A voltage divider, generally indicated by the numeral 50, is connected across the high voltage source 20 and switch 21. An adjustable tap 51 on the voltage divider 50 is connected to the conductive portions of conductive screens 25 and 30. Therefore, the conductive screens 25 and 30 are maintained at an opposite polarity relative to the base electrode 15. Carrier particles 11 are originally charged by the base electrode 15 so as to have, for example, a negative charge, and are repelled therefrom so as to contact the screens 25 or 30. Thereafter, the carrier particles in contact with the screen are charged by conduction and repelled by the screen toward the base electrode 15. Such an arrangement effectively reduces any deleterious buildup of charge on the screens 25 or 30.

While preferred forms and arrangement of parts have been shown in illustrating the invention, and preferred methods have been disclosed for practicing the invention, it is to be clearly understood that various changes in details and arrangement of parts may be made without departing from the spirit and scope of the invention, as defined in the appended claimed subject matter.

I claim:

1. An electrostatic process for applying a selective coating to a substrate comprising the steps of mixing conductive carrier particles with toner particles so that the toner particles triboelectrically adhere to the carrier particles, depositing said carrier particles and said toner particles on a base electrrode in spaced relation to said substrate, establishing an electric field in the space between said substrate and said base electrode for moving said carrier particles and toner particles toward said substrate, obstructing the motion of said conductive carrier particles, and causing said toner particles to continue toward and impinge upon said substrate, wherein the step of obstructing the motion of said conductive carrier particles includes the step of providing a screen having interstices therein of proper size to allow passage of said toner particles and to preclude passage of said carrier particles therethrough.

2. In an electrostatic coating process for selectively coating a substrate, the steps of providing a developer comprising conductive carrier particles and non-conductive toner particles triboelectrically adhering thereto with said carrier particles being larger than said toner particles, providing an electrically conductive base electrode in spaced relation to said substrate, providing an electrically conductive screen with apertures therein which are smaller than said carrier particles and larger than said toner particles and locating said screen in the space between said base electrode and said substrate, positioning a layer of developer between the side of said base electrode toward said substrate and said conductive screen, and creating an electric field between said base electrode and said conductive screen for oscillating said developer therebetween causing at least some of said toner particles to pass through said apertures and impinge upon said substrate while precluding passage of said carrier particles through said aperture.

3. In an electrostatic coating process as defined in claim 2 wherein the step of providing said electrically conductive screen includes the additional step of blocking selected ones of said apertures so that the remaining apertures define a stencil pattern having any large portions thereof defined by a plurality of unblocked apertures.

4. An electrostatic process for applying a selective coating to a substrate comprising the steps of providing aperture means in a first electrode, locating said first electrode in spaced relation adjacent a second electrode, placing said substrate adjacent said first electrode on the side thereof remote from said second electrode, connecting a high voltage power source across said first and second electrodes for creating an electric field therebetween, introducing into the space between said first and second electrodes a developer mixture comprised of electrically conductive carrier particles and electrically non-conductive toner particles; causing said carrier particles to assume the polarity of said first electrode and the polarity of said second electrode, alternately, for causing said carrier particles to oscillate between said first and second electrodes such that at least some of said toner particles pass through said aperture means in said first electrode and becomes deposited on said substrate; and including the step of choosing the size of said carrier particles so that said carrier particles are large enough to prevent passage of said carrier particles through said aperture means in said first electrode.

5. An electrostatic process as defined in claim 4 wherein said first electrode is comprised of an electrically conductive screen, and said aperture means are formed in said screen with interstices such that said carrier particles are larger than said aperture means and said toner particles are smaller than said aperture means.

6. An electrostatic process as defined in claim 5 including the step of blocking selected ones of said aperture means for defining a pattern with said electrically conductive screen.

7. An electrostatic process as defined in clam 4 including the steps of locating a third electrode adjacent the side of said substrate remote from said first electrode, and creating a second electric field between said first electrode and said third electrode for aiding the toner particles which pass through said aperture means to be deposited on said substrate.

8. An electrostatic process as defined in claim 7 wherein said first electrode is comprised of an electrically conductive screen, and said aperture means are formed in said screen such that said carrier particles are larger than said aperture means and said toner particles are smaller than said aperture means.

9. An electrostatic process as defined in claim 8 including the step of blocking selected ones of said aperture means for defining a pattern with said electrically conductive screen.

10. Apparatus for coating a substrate with a selective coating of toner particles, said apparatus comprising a pair of spaced electrodes and a power source, said electrodes being disposed on opposite sides of said substrate, one of said pair of electrodes being connected to the positive side of said power source and the other of said pair of electrodes being connected to the negative side of said power source, a developer mixture of conductive carrier particles and non-conductive toner particles carried by one of said pair of electrodes, and a screen interposed between said developed mixture and the other of said pair of electrodes, said screen being comprised of a mesh of conductive material, said mesh being defined by a plurality of interstices of sufficient size for passage of said toner particles therethrough and for precluding passage of said carrier particles therethrough.

11. Apparatus as defined in claim 10 wherein said conductive carrier particles and non-conductive toner particles have triboelectric properties for causing the toner particles to have a polarity opposite from the polarity of the electrode which is separated from said screen by said substrate.

12. Apparatus as defined in claim 10 wherein means are provided for applying a potential difference to said screen relative to said pair of spaced electrodes whereby said carrier particles are alternatively attracted to and repelled from said screen.

13. Apparatus for applying a selective coating to a substrate, said apparatus comprising a first electrode means having aperture means formed therein, a second electrode means disposed adjacent to and spaced from said first electrode means, means for supporting said substrate adjacent to said first electrode means on the side thereof remote from said second electrode means, a high voltage power source means for establishing a potential difference between said first electrode means and said second electrode means for creating an electric field therebetween, a developer mixture comprising conductive carrier particles and non-conductive toner particles, said toner particles being smaller than said aperture means, and means for introducing said developer mixture into the space between said first electrode means and said second electrode means causing said toner particles to pass through said aperture means and become deposited upon said substrate, said carrier particles being larger than said aperture means for precluding passage of said carrier particles through said aperture means.

14. Apparatus as defined in claim 13 including a third electrode means spaced from said first electrode means on the side thereof remote from said second electrode means, and means for establishing a potential difference between said first electrode means and said third electrode means.

15. Apparatus means as defined in claim 13 wherein said first electrode means is comprised of an electrically conductive screen, said aperture means being formed in said screen in uniformly spaced relation, and means blocking selected ones of said aperture means for defining a pattern comprised of open portions and closed portions with at least some of said open portions including a plurality of said aperture means.

16. Apparatus as defined in claim 15 including a third electrode means spaced from said first electrode means on the side thereof remote from said second electrode means, and means for creating a second electric field between said first electrode means and said third electrode means for aiding toner particles which pass through said aperture means to be deposited on said substrate.

17. Apparatus as defined in claim 16 wherein said conductive carrier particles and non-conductive toner particles have triboelectric properties for causing said toner particles to have a polarity opposite from the polarity of said third electrode means.

18. Apparatus as defined in claim 13 including means for causing said developer mixture to be moved transversely of and past said first electrode means and said second electrode means.

19. Apparatus as in claim 18 wherein said means for causing comprises a support member for maintaining said first electrode means and said second electrode means at an angle with respect to the horizontal, whereby said developer mixture is cascaded between said first electrode means and said second electrode means by the force of gravity.

20. In an electrostatic coating apparatus for selectively coating a substrate, a base electrode, a stencil screen having apertures therein, a developer comprising toner particles and conductive carrier particles, said toner particles being smaller than said carrier particles, means for placing said developer between said base electrode and said stencil screen, means for establishing an electric field between said base electrode and said stencil screen for oscillating said developer therebetween and causing at least some of said toner particles to pass through said apertures, said stencil screen comprising a wire mesh screen with the apertures therein being smaller than said carrier particles and larger than said toner particles, and means blocking some of said apertures so that the remaining apertures define a stencil pattern having any large portions thereof defined by a plurality of unblocked apertures.

21. Apparatus for coating a substrate with a selective coating of toner particles, said apparatus comprising a pair of spaced electrodes and a power source, one of said pair of electrodes being connected to the positive side of said power source and the other of said pair of electrodes being connected to the negative side of said power source, a developer mixture of carrier particles and toner particles carried by one of said pair of electrodes, and a screen interposed between said developer mixture and the other of said pair of electrodes, said screen comprising a sheet of conductive material having openings therein which are smaller than said carrier particles and larger than said toner particles, and a patterned stencil screen interposed between said electrodes in spaced relation to said sheet of conductive material.

22. Apparatus for coating a substrate with a selective coating of toner particles, said apparatus comprising a pair of spaced electrodes and a power source, one of said pair of electrodes being connected to the positive side of said power source and the other of said pair of electrodes being connected to the negative side of said power source, a developer mixture of carrier particles and toner particles carried by one of said pair of electrodes, a screen interposed between said developer mixture and the other of said pair of electrodes, first means for causing said developer mixture to be moved past said screen, and supply means for introducing additional developer mixture between said screen and one of said electrodes, said first means being comprised of a support member for maintaining said electrodes and said screen at an inclination to the horizontal, said developer mixture being cascaded between one of said electrodes and said screen by the force of gravity.

23. Apparatus for coating a substrate, said apparatus comprising an electrically conductive base electrode, means for supplying a developer mixture including electrically conductive carrier particles and electrically non-conductive toner particles to said base electrode, an electrically conductive screen spaced from said base electrode and located on a side thereof toward the intended position of a substrate, said carrier particles being larger than said toner particles and said screen having openings therein of a size to freely pass said toner particles while preventing passage of said carrier particles, electrical power supply means coupled to said base electrode and said screen to establish an electric field therebetween and to differently charge said base electrode and said screen for putting a charge on said carrier particles and driving said carrier particles having toner particles adhering thereto from said base electrode against said screen with certain of said toner particles passing through said screen and the charge on the carrier particles engaging the screen being discharged and an opposite polarity charge being applied thereto through said screen to repel the carrier particles back towards said base electrode.

24. Apparatus as in claim 23 including stencil means associated with said screen for limiting toner particle flow therethrough to a predetermined pattern.

References Cited

UNITED STATES PATENTS

| | | |
|---|---|---|
| 2,787,556 | 4/1957 | Haas. |
| 2,874,063 | 2/1959 | Greig. |
| 2,930,351 | 3/1960 | Giaimo. |
| 2,940,864 | 6/1960 | Watson. |
| 3,013,703 | 12/1961 | Hunt. |
| 3,081,698 | 3/1963 | Childress et al. |
| 3,321,768 | 5/1967 | Byrd. |

FOREIGN PATENTS

| | | |
|---|---|---|
| 81,920 | 9/1956 | Denmark. |

EDGAR S. BURR, Primary Examiner

U.S. Cl. X.R.

101—129; 117—17.5; 118—637